Feb. 27, 1945.　　　　F. D. JONES　　　　2,370,355

SIDE DELIVERY RAKE

Filed July 22, 1942　　　　2 Sheets-Sheet 1

INVENTOR
Frank D. Jones

BY
ATTORNEYS

Feb. 27, 1945. F. D. JONES 2,370,355
SIDE DELIVERY RAKE
Filed July 22, 1942 2 Sheets-Sheet 2

INVENTOR
Frank D. Jones
BY
ATTORNEYS

Patented Feb. 27, 1945

2,370,355

UNITED STATES PATENT OFFICE 2,370,355

SIDE DELIVERY RAKE

Frank D. Jones, Ottumwa, Iowa, assignor to Dain Manufacturing Company of Iowa, Ottumwa, Iowa, a corporation of Iowa Application July 22, 1942, Serial No. 451,908

8 Claims. (Cl. 56—376)

The present invention relates generally to side delivery rakes and particularly to the rear caster wheel support for a side delivery rake. I have found that side delivery rakes, during operation and especially when raking unusually heavy crops, have a tendency to twist around so that their rear ends tend to lag behind the normal operating position of the rake. This is due to the fact that most side delivery rakes have a single draft tongue connected to the tractor by a single pivot pin, the draft tongue being offset toward the forward end of the obliquely positioned rake frame, whereby the side draft of the implement during raking operation has a tendency to force the frame to a more nearly fore and aft extending position. This causes the rake to operate over a narrower swath, and consequently to reduce the capacity of the rake, as well as to cause the front wheels to run at an angle to the line of advance and thus to increase the draft of the rake upon the tractor.

The principal object of my invention, therefore, relates to the provision of means for compensating for this side draft and thus reducing the tendency of the rear end of the rake to lag behind. In the accomplishment of this object, I have found that by laterally tilting the rear caster wheel which supports the rear end of the frame, this wheel will trail at an angle to the line of advance and will thus tend to resist the side draft and cause the rear end of the rack to swing outwardly to its normal operating position.

These and other objects and advantages of my invention will be apparent to those skilled in the art after a consideration of the following description, in which reference is had to the drawings appended hereto, in which Figure 1 is a plan view of a side delivery rake embodying the principles of my invention;

Figure 1:
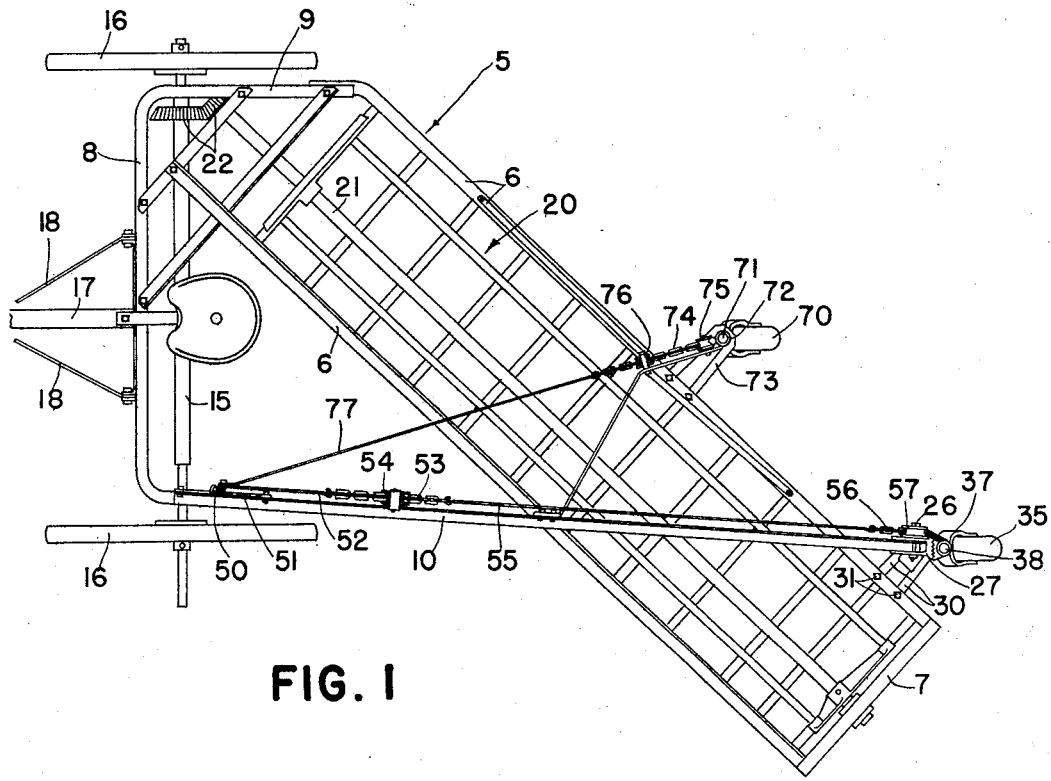
Figure 2:
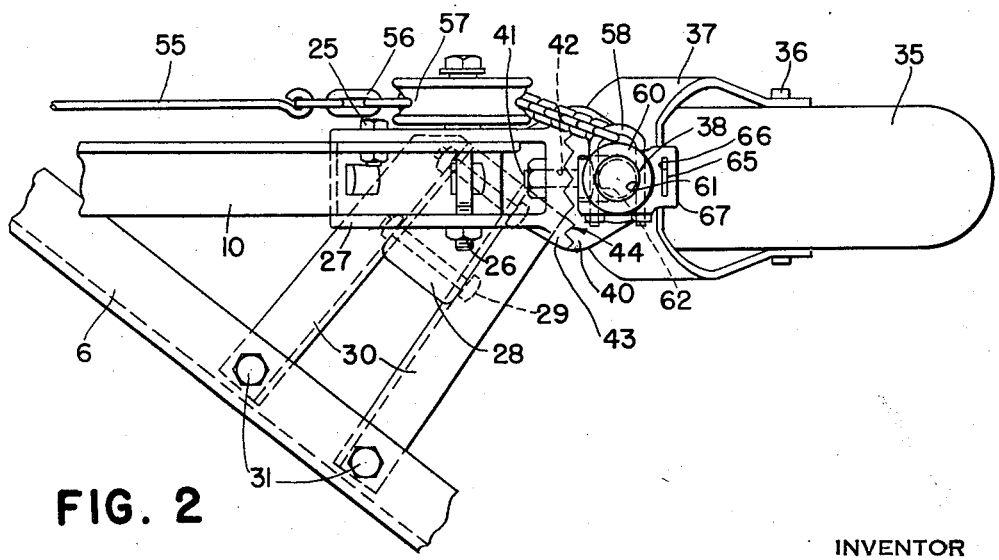
Figure 2 is a plan view, drawn to an enlarged scale, of the rear end of the rake frame and the caster wheel support.

Referring now to the drawings, the side delivery rake, indicated in its entirety by reference numeral 5, comprises a conventional rake frame including a pair of frame members 6 disposed obliquely to the line of advance of the implement and interconnected at their rear ends by a frame member 7. The forward ends of the oblique members 6 are suitably attached to a U-shaped draft frame including a transverse portion 8, a short rearwardly extending leg portion 9 at one end of the transverse portion 8, and a long leg portion 10 extending rearwardly from the opposite end of the transverse portion 8. The long leg 10 arches over the oblique frame portion 6 and supports the latter in a manner well-known to those skilled in the art.

The forward end of the frame is carried on a transverse axle 15, which is disposed substantially parallel to the transverse frame portion 8 and is attached at opposite ends, respectively, to the leg portions 9, 10 of the frame. A pair of supporting wheels 16 are rotatably mounted on opposite ends of the axle 15. A draft tongue 17 is connected to the transverse portion 8 of the rake frame between the wheels 16, and extends forwardly to a suitable means for pivotally connecting the forward end of the tongue 17 to the drawbar of a tractor (not shown). A pair of diagonal braces 18 are provided for bracing the tongue 17 against lateral movement with respect to the rake frame.

A rake reel 20, of any suitable and conventional design known to those skilled in the art is rotatably supported within the oblique portion of the frame between the frame members 6, and is carried on a reel shaft 21 which is driven from the axle 15 by means of a pair of intermeshing bevel gears 22.

The rear end of the long frame leg 10 is connected by suitable bolts 25, 26 to a bracket member 27, which has a base 28 fixed by bolts 29 to a support comprising a pair of short structural angles 30 fixed by suitable bolts 31 adjacent the rear end of the rear oblique frame members 6.

The bracket 27 is supported on a rear caster wheel 35, which is journaled on an axle 36 carried in a fork 37. The fork is mounted on the lower end of a spindle 38, which extends upwardly from the central portion of the fork 37, the latter being fixed to the spindle 38 in an angular relation thereto, to position the axle 36 in offset relation to the axis of the spindle, in order to produce a castering action as is well known to those skilled in the art. The spindle 38 is rotatably received within a sleeve bearing member 39, provided with a boss 40 raised on one side thereof and cast integrally therewith. The boss 40 is generally circular in form about a generally horizontal fore and aft extending axis, on which is provided an aperture 42 adapted to receive a bolt 41, which extends forwardly through a suitable aligned aperture in a generally vertical boss 43 provided at the rear of the bracket 27. The coacting surfaces of the bosses 40, 43 are provided with intermeshing serrations, indicated at 44, which extend radially outwardly from the axis of the bolt 41, and serve to prevent the bearing member 39 from twisting relative to the bracket 27 about the axis of the bolt 41, when the latter is tight.

Figures 3, 4:
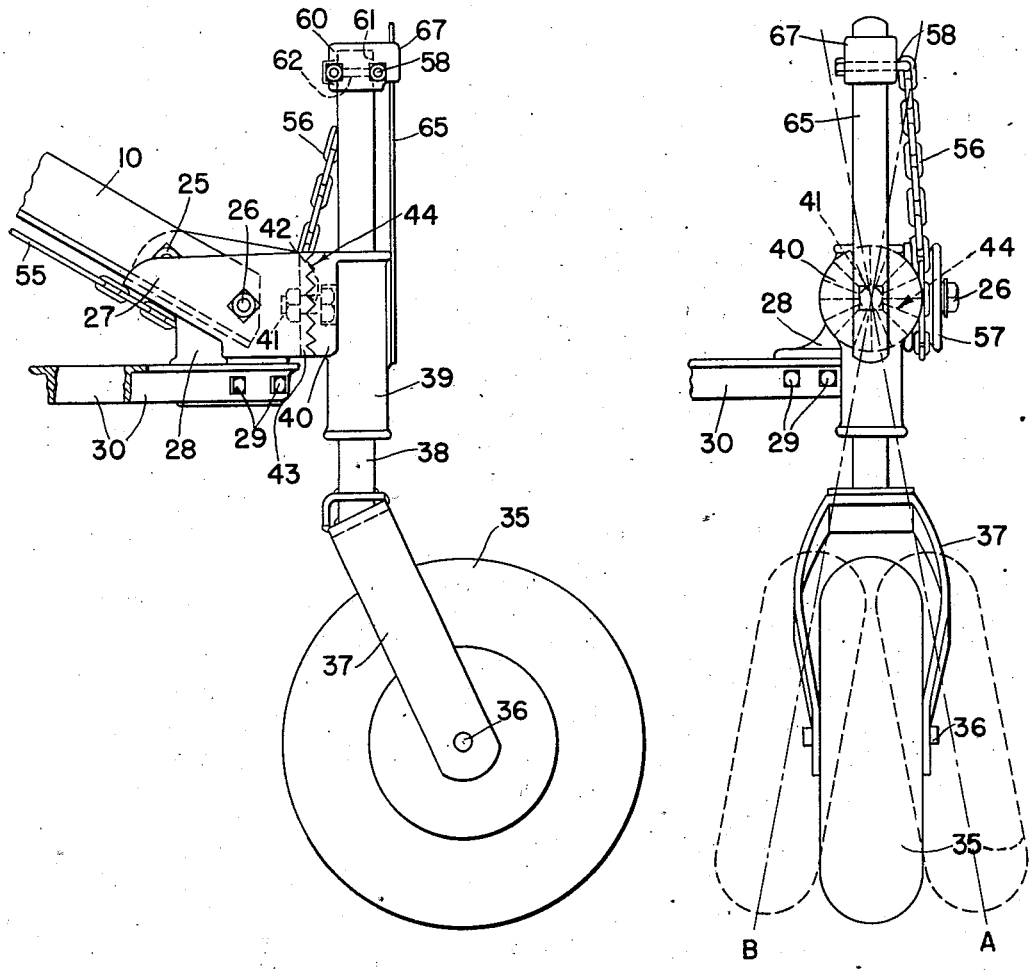
Figure 3 is a side elevational view of the caster wheel support.
Figure 4 is a rear elevational view of the caster wheel support.

As indicated in the drawings, the caster wheel is disposed in a fore and aft extending vertical plane, which is suitable for transporting the rake from one field to another. After loosening the bolt 41, however, the bearing sleeve 39 can be separated rearwardly from the bracket 27 to the extent that the serrations are withdrawn from their meshing relation, after which the bearing sleeve 39, together with the entire wheel and spindle assembly, can be adjusted angularly about the fore and aft axis of the bolt 41. By setting the wheel 35 to the right as viewed in Figure 4, or toward the center of the rake in the position marked "A," the caster wheel 35 will tend to swing about the axis of the spindle 38 inwardly toward the center line of the rake, and thus have a tendency to roll toward the left during forward movement of the machine, and thus resist the tendency of the rear end of the rake frame to lag behind during forward operation. It is evident, that the heavier the crop that is being raked, the greater is the tendency for the rear end of the frame to lag behind. Therefore, when the crop is heavy, it is desirable to set the wheel at a greater angle to the vertical, than when the crop is light, in order to produce a greater resisting force to the side draft of the implement. If the wheel is set in the opposite direction from the vertical, in the position indicated at "B," the tendency will be for the rear end of the rake to lag even farther behind than it would with the wheel in a vertical plane.

The rake frame is raised and lowered between operating and transport positions, by means of a hand lever 50 in a manner which is more or less conventional. The hand lever 50 is pivoted on the side of the frame leg 10 and is held in adjusted position by a suitable latch and sector mechanism 51. The lever 50 is connected by a rod 52 to a chain 53 which passes over a pulley 54 on the intermediate portion of the arched leg member 10, and the chain 53 is connected by a tension rod 55 to a chain 56 at the rear of the rake. The chain 56 is trained upwardly over a sheave 57, journaled on the bolt 26 and rotatable about a transverse axis. The end of the chain 56 is connected through a U-shaped clevis 58 to the upper end of the spindle 38 in a manner which will be presently described. Thus, by swinging the lever 50, the chain 56 is pulled forwardly around the sheave 57 and reacts against the clevis 58, thereby raising the bracket 27 and frame members 6, relative to the ground, sliding the bearing sleeve 39 upwardly along the spindle 38. In this manner, the entire frame 5 and reel 20 are raised at the rear end to transport position.

The clevis 58 is U-shaped, as has been described, the legs of which are inserted through a cap member 60, which has an interior bore 61 to receive the upper end of the spindle 38. The latter is provided with a groove 62 encircling the spindle near the outer end, through which groove the legs of the clevis 58 are slidably disposed. In this manner, the cap 60 is secured against relative vertical movement on the spindle 38, but permits the latter to rotate without rotating the cap, and thus does not wind the chain 56 about the spindle by virtue of rotation of the latter. The cap 60 is also secured against rotation by means of a flat bar 65 which is fixed, as by welding, to the back of the bearing sleeve 39 and extends upwardly through a slot 66 in a lug 67 on the rear of the cap 60.

A second caster wheel 70 is provided near the center of the rake frame and is provided with a spindle 71 which is rotatable within a vertical sleeve 72, the latter being fixed to a bracket 73 on the rear frame members 6, although this bearing sleeve may be of the angularly adjustable type, described above, if so desired. The upper end of this spindle 71 is connected to the hand lever 50 by a chain 74, which passes under pulleys 75, 76 and is connected by a rod 77 with the lever 50, so that when the latter is actuated, the spindles 38, 71 of both caster wheels 35, 70, respectively, are forced downwardly to raise the frame.

I claim:

1. An implement comprising a frame, wheel means for supporting the forward end of said frame, a caster wheel for supporting the rear of said frame, and adjustable means connecting said caster wheel to said frame, said adjustable means being so constructed and arranged that said caster wheel is adjustably securable relative to said frame angularly about a fore and aft extending axis.

2. An implement comprising a frame, wheel means for supporting the forward end of said frame, draft means connected to said frame in laterally offset relation thereto, a caster wheel for supporting the rear of said frame and having a spindle extending upwardly therefrom, a bearing member in which said spindle is rotatable, and means for attaching said bearing member to said frame providing for angular adjustment of said member about a fore and aft extending axis, said attaching means being so constructed and arranged that said wheel can be tilted laterally for resisting the side draft of the implement.

3. A side delivery rake comprising a frame normally disposed obliquely relative to the direction of travel, wheel means for supporting the forward end of said frame, a single draft tongue connected to said frame in laterally offset relation toward the forward end thereof, a caster wheel for supporting the rear of said frame and having a spindle extending upwardly therefrom, a bearing member in which said spindle is rotatable, and means for attaching said bearing member to said frame providing for angular adjustment of said member about a fore and aft extending axis, said attaching means being so constructed and arranged that said wheel can be tilted laterally for resisting the tendency of the rearward end of the frame to lag behind its normal operating position.

4. A side delivery rake comprising a frame normally disposed obliquely relative to the direction of travel, wheel means for supporting the forward end of said frame, a single draft tongue connected to said frame in laterally offset relation toward the forward end thereof, a caster wheel for supporting the rear of said frame and having a spindle extending upwardly therefrom, a bearing member in which said spindle is rotatable, said spindle being also slidable up and down within said bearing member, means for attaching said bearing member to said frame providing for angular adjustment of said member about a fore and aft extending axis, said attaching means being so constructed and arranged that said wheel can be tilted laterally for resisting the tendency of the rearward end of the frame to lag behind its normal operating position, and means for raising and lowering said frame and bearing member relative to said spindle and caster wheel.

5. An implement comprising a frame, means at one end of said frame for supporting the latter on the ground, propelling means for said implement at said one end of said frame, a caster wheel at the opposite end of said frame for supporting the latter, and means connecting said caster wheel to said frame, said connecting means being constructed and arranged for adjustably fixing said caster wheel to said frame in any of several angularly spaced positions of said wheel about a fore and aft extending axis to control the tendency of said wheel to run at an angle to the direction of travel.

6. An implement comprising a frame, means at one end of said frame for supporting the latter on the ground, propelling means for said implement at said one end of said frame, a caster wheel at the opposite end of said frame for supporting the latter and having an upwardly extending spindle on which said caster wheel is mounted, a bearing member in which said spindle is rotatable, and means for attaching said bearing member to said frame, said attaching means being so constructed and arranged that said bearing member can be angularly adjusted in increments about a fore and aft extending axis to tilt the wheel laterally for controlling the tendency of said wheel to run at an angle to the direction of travel, whereby the side draft of the implement can be governed.

7. An implement comprising a frame, wheel means for supporting the forward end of said frame, a caster wheel for supporting the rear of said frame, and adjustable means connecting said caster wheel to said frame, said adjustable means comprising a support for said caster wheel, a fore and aft extending bolt pivotally connecting said caster wheel support to said frame, providing for angular adjustment of said wheel about the axis of said bolt, and a pair of abutting faces on said frame and said caster wheel support, respectively, said faces having intermeshing serrations extending radially from said bolt to prevent relative rotation of said support and said frame when said bolt is tightened.

8. An implement comprising a frame, wheel means for supporting the forward end of said frame, draft means connected to the forward end of said frame, a caster wheel at the rear end of said frame and having a spindle extending upwardly, a bearing member in which said spindle is rotatable, and means for attaching said bearing member to said frame providing for angular adjustment of said member about a fore and aft extending axis, said attaching means comprising a fore and aft extending bolt pivotally connecting said bearing member to said frame and a pair of abutting faces on said frame and said member, respectively, said faces having intermeshing serrations extending radially from said bolt to prevent angular movement of said member relative to said frame when said bolt is tightened.

FRANK D. JONES.